(12) United States Patent
Kim et al.

(10) Patent No.: US 10,676,665 B2
(45) Date of Patent: Jun. 9, 2020

(54) OUTDOOR COLOR-CHANGEABLE FILM HAVING SELF-RECOVERING PROPERTIES

(71) Applicant: E and B Co., Ltd., Chungcheongbuk-do (KR)

(72) Inventors: Sang-tae Kim, Daejeon (KR); Tae-sung Lee, Goyang-si (KR)

(73) Assignee: E and B Co., Ltd., Chungcheongbuk-do (KR)

( * ) Notice: Subject to any disclaimer, the term of this patent is extended or adjusted under 35 U.S.C. 154(b) by 176 days.

(21) Appl. No.: 15/934,208

(22) Filed: Mar. 23, 2018

(65) Prior Publication Data
US 2019/0292443 A1    Sep. 26, 2019

(51) Int. Cl.
| | | |
|---|---|---|
| *B32B 7/02* | (2019.01) | |
| *C09K 9/02* | (2006.01) | |
| *B32B 27/08* | (2006.01) | |
| *B32B 27/36* | (2006.01) | |
| *C08L 67/02* | (2006.01) | |
| *C08L 75/04* | (2006.01) | |
| *B32B 27/28* | (2006.01) | |

(52) U.S. Cl.
CPC .............. *C09K 9/02* (2013.01); *B32B 27/08* (2013.01); *B32B 27/281* (2013.01); *B32B 27/365* (2013.01); *C08L 67/02* (2013.01); *C08L 75/04* (2013.01); *C08L 2201/08* (2013.01); *C08L 2203/16* (2013.01)

(58) Field of Classification Search
CPC ..... B32B 27/08; B32B 27/281; B32B 27/365; C08L 2201/08; C08L 2203/16; C08L 67/02; C08L 75/04; C09K 9/02
See application file for complete search history.

(56) References Cited

FOREIGN PATENT DOCUMENTS

| | | |
|---|---|---|
| KR | 10-0847342 B1 | 7/2008 |
| KR | 10-1015024 B1 | 2/2011 |
| KR | 10-1369918 B1 | 3/2014 |
| KR | 10-1587190 B1 | 1/2016 |

*Primary Examiner* — Lawrence D Ferguson
(74) *Attorney, Agent, or Firm* — Rabin & Berdo, P.C.

(57) ABSTRACT

Disclosed is an outdoor color-changeable film with self-recovering properties that includes a transparent base film; a hard-coating pearl layer formed on an outer surface of the transparent base film and includes pearl particles dispersed in a hard-coating agent; a first adhesive layer disposed on another surface of the transparent base layer; a color base film disposed on the first adhesive layer to laminate the color base film onto a surface of the hard-coating pearl layer; a second adhesive layer coated on a surface of the color base film; and a release film detachably laminated onto the second adhesive layer. The self-recovering properties include water repellency, anti-fouling, and antibacterial functions, ultraviolet ray blocking ability, and use in various fields due to a long-lasting film property and an insecticidal effect.

7 Claims, 1 Drawing Sheet

OUTDOOR COLOR-CHANGEABLE FILM HAVING SELF-RECOVERING PROPERTIES

This invention has been published in Korean Patent No. 10-1752847 published on Jul. 11, 2017.

TECHNICAL FIELD

The present invention relates to a color changeable film and more particularly, to an outdoor color changeable film with self recovering functions which has self recovering functions such as water repellent, anti-fouling, and antibacterial functions, can block ultraviolet rays, and can be used in various fields due to a long-lasting film property and an insecticidal effect.

Particularly, the present invention relates to an outdoor color changeable film with self recovering functions which is fabricated using a hard base film so as to be easily installed on a flat surface such as glass of a vehicle or a building.

BACKGROUND ART

In the case of window films used in buildings and glass, products have been developed by focusing on blocking an ultraviolet range (150 to 380 nm), a visible range (380 to 780 nm) and an infrared range (780 to 23000 nm) depending on the wavelength of the sunlight.

There are various technologies related to the functional film, and for example, there are Patent Documents 1 and 2.

Patent Document 1 relates to a plastic film including a support substrate; and a coating layer formed on at least one surface of the support substrate, in which the coating layer includes a crosslinking copolymer in which 3 to 6 functional acrylate-based monomers and polyrotaxane are copolymerized in a weight ratio of 5:5 to 8:2, and inorganic particles dispersed in the crosslinking copolymer.

Patent Document 2 relates to a display protective film including a base film layer made of polyethylene terephthalate; a first adhesive layer with an acryl-based adhesive formed on one surface of the base film layer; a shock absorbing layer made of thermoplastic polyurethane formed on the first adhesive layer; a second adhesive layer with an acryl-based adhesive formed on the shock absorbing layer; a PET-made surface film layer formed on the second adhesive layer; an anti-glare layer formed on the surface film layer and containing an acrylate-based binder resin and beads having an average particle diameter of 1 to 10 μm on the binder resin; an antimicrobial coating layer formed on the anti-glare layer; a third adhesive layer with a silicone adhesive formed on the other surface of the base film layer; and a release film formed on the third adhesive layer.

As such, various functional films have been developed and used, but in recent years, many color changeable films which are particularly colorful and beautiful in appearance among the window films have been used.

Such a color changeable film is a film which is viewed in different colors depending on a viewing angle and color-changed to various colors such as yellow, red, and blue according to an incident angle of the sunlight.

Such a color changeable film is usually fabricated by laminating 100 to 300 layers of thin PET films, and as the color changeable film is fabricated by laminating the multiple layers, there is a problem that a defective rate increases in the fabricating process. That is, if a foreign substance is inserted between the layers even in any one of the processes of laminating the multiple layers, the defect of the fabric occurs, and thus, there is a problem in that maintenance and management of the manufacturing facility is difficult and the manufacturing cost is increased because a very careful caution is required for the process management.

Meanwhile, a film having pearl is used, but the film having pearl is mainly used for an opaque film.

The reason why the pearl is coated on the opaque film is that there is a problem in that a haze occurs according to the pearl content and a type of synthetic resin ingredient, and when the pearl powder is mixed with a coating agent, the pearl is first evenly dispersed in the coating agent, but over time, the pearl sinks and then the pearl is concentrated only in a portion.

In order to improve the disadvantages, various technologies have been developed and for example, there are Patent Documents 3 and 4.

Patent Document 3 relates to a decoration sheet printed with various patterns in colors including a base layer made of a PET film; a base color printing layer formed by printing a base color on the base layer; a diffused reflection layer formed by coating an acryl adhesive formed by mixing 10 to 20 wt % of a diffused reflection filler and 2 to 10 wt % of a pigment with 70 to 88 wt % of an acrylic adhesive on the base color printing layer; a reinforcing layer formed by bonding the PET film on the diffused reflection layer; a pattern printing layer formed by printing various patterns on the reinforcing layer; a release adhesive layer formed by coating an acrylic adhesive on the pattern printing layer; and a release film layer formed by adhering a release film on the release adhesive layer which are sequentially laminated from the bottom, in which the diffused reflection filler is formed by adding 30 to 40 wt % of a hologram chip, 30 to 40 wt % of pearl, and 30 to 40 wt % of an aluminum chip.

However, the conventional sheet has a disadvantage in that the content of the pearl is too large and the manufacturing cost is high.

Patent Document 4 relates to a method for manufacturing a functional fabric which is constituted by an adhesive resin layer formed on the surface of a fabric, a mica-containing synthetic resin layer formed on the surface of the adhesive resin layer, and a pearl-containing synthetic resin layer formed on the surface of the mica-containing synthetic resin layer, and includes 1 to 50 wt % of pearl particles.

As described above, in the conventional method for manufacturing the functional fabric, there is a disadvantage in that the content of the pearl particles is high, the pearl-containing layer needs to be formed on the synthetic resin, and thus the manufacturing process is complicated and it is unsuitable for using the film as a coating film of automobile glass or the like.

Further, in the case of the conventional film including the pearl, there is a disadvantage in that a haze occurs according to the pearl content and a type of resin ingredient, and when the pearl powder is mixed with the adhesive layer, the pearl is first evenly dispersed, but over time, the pearl particles sink, and thus the film is not used for a transparent window and the like and its use is limited to only an opaque decoration film.

PRIOR ART DOCUMENT

Patent Document (Patent Document 1) Korean Patent Registration No. 10-1587190
(Patent Document 2) Korean Patent Registration No. 10-1369918

(Patent Document 3) Korean Patent Registration No. 10-0847342
(Patent Document 4) Korean Patent Registration No. 10-1015024

DISCLOSURE

Technical Problem

In order to solve the problems in the related art as described above, an object of the present invention is to provide an outdoor color changeable film with self recovering functions capable of exhibiting a color changeable effect while improving durability by containing pearl in a self-recovering coating agent.

Another object of the present invention is to provide an outdoor color changeable film with self recovering functions capable of exhibiting water repellent, anti-fouling, and anti-bacterial effects as well as various color changeable effects by the pearl while improving durability of a transparent base film by mixing a ultraviolet blocking agent and a coating agent having water repellent and anti-fouling functions with a coating agent having a self recovering function.

Yet another object of the present invention is to provide an outdoor color changeable film with self recovering functions which is coated by mixing pearl with a hard coating layer to prevent the pearl from sinking in any one side and becoming ununiform as well as to produce the film less expensively by simplifying a manufacturing process.

Particularly, the present invention relates to an outdoor color changeable film with self recovering functions which is fabricated using a hard base film having low elasticity so as to be easily installed on a flat surface such as glass of a vehicle or a building, and a manufacturing method thereof.

Technical Solution

In order to solve the objects, an outdoor color changeable film with self recovering functions is a color changeable film which is constituted by a hard coating pearl layer capable of self recovering, a transparent base film with the hard coating pearl layer formed on the surface, an adhesive coating layer formed on the bottom of the transparent base film, and a release film detachably laminated below the adhesive coating layer and is constituted by mixing pearl particles with a hard coating agent forming the hard coating pearl layer.

A color base film in which a color adhesive layer is laminated on a surface facing the hard coating layer may be further laminated between the transparent base film and the adhesive coating layer.

The transparent base film 20 may be any one of polyethylene terephthalate (PET), polyimide (PI), and polycarbonate (PC) which have low elasticity and hardness, the hard coating agent forming the hard coating pearl layer 10 may have the viscosity of 40 to 45 cps and the self-recovering coating agent: the pearl particles: the curing agent may be mixed at a weight ratio of 90 to 100:0.5 to 2:35 to 40, and the self-recovering coating agent may use a mixture of 5 to 30 parts by weight of a trimethylene oxide-reactive polyurethane prepolymer with respect to 100 parts by weight of a coating agent-based chitosan-reactive polyester prepolymer.

The particle size of the pearl particles may be 1 to 100 μm.

Advantageous Effects

As described above, according to the outdoor color changeable film with self recovering functions and the manufacturing method thereof of the present invention, it is possible to express various colors by the pearl as well as to prevent glass of a vehicle and the like from being damaged by external shocks such as a stone chip by providing the hard coating layer including the pearl.

Further, when the pearl is mixed with the hard coating layer, the pearl is evenly distributed in the hard coating agent by adjusting the viscosity of the hard coating agent, and thus, it is possible to express uniform colors.

Further, since the pearl is mixed with the hard coat layer without mixing the pearl with another adhesive layer, it is possible to simplify a manufacturing process of a color changeable film by reducing a separate process for the pearl formation and reduce costs required for fabricating the color changeable film by reducing a defect rate.

MODES OF THE INVENTION

Figure 1:
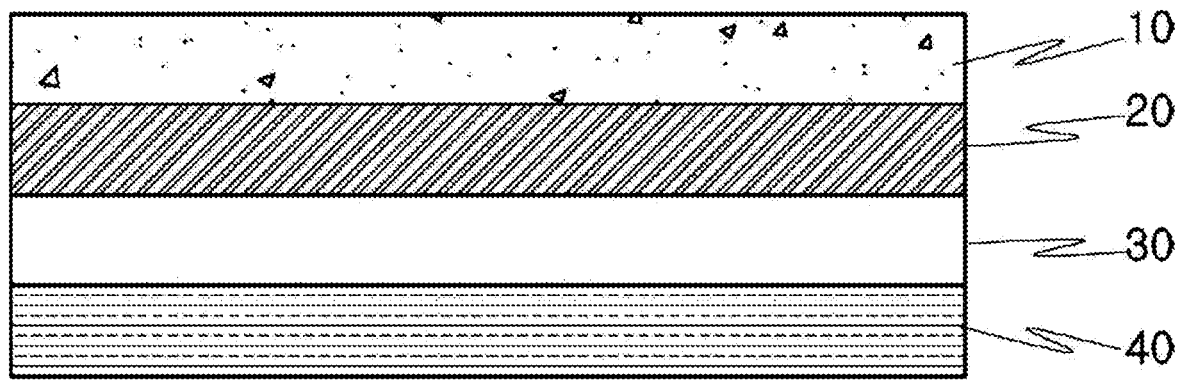
FIG. 1 illustrates a laminated structure of an example of an outdoor color changeable film with self recovering functions according to the present invention.
Figure 2:
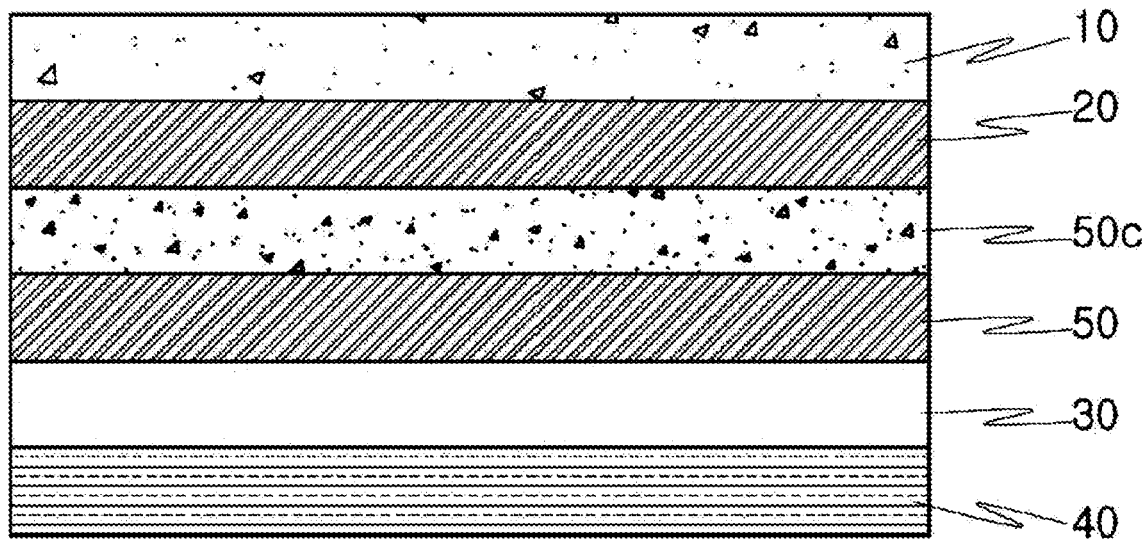
FIG. 2 illustrates a laminated structure of another example of an outdoor color changeable film with self recovering functions according to the present invention.

The present invention may have various modifications and various exemplary embodiments and specific exemplary embodiments will be described in detail in the detailed description. However, this does not limit the present invention to specific exemplary embodiments, and it should be understood that the present invention covers all the modifications, equivalents and replacements included within the idea and technical scope of the present invention.

In the description of each drawing, like reference numerals are used for like constitute elements. In describing the present invention, when it is determined that the detailed description of the publicly known art related to the present invention may obscure the gist of the present invention, the detailed description thereof will be omitted.

According to the present invention, it is possible to simplify a manufacturing process of a self-recovering color changeable film and reduce manufacturing cost without performing a separate process in order to exhibit a pearl effect by forming a hard coating layer by mixing pearl particles with the hard coating layer requiring lamination.

An outdoor color changeable film with self recovering functions of the present invention is a color changeable film which is constituted by a hard coating pearl layer 10 capable of self recovering, a transparent base film 20 with the hard coating pearl layer 10 formed on the surface, an adhesive coating layer 30 formed on the bottom of the transparent base film 20, and a release film 40 detachably laminated below the adhesive coating layer 30 and is constituted by mixing pearl particles with a hard coating agent forming the hard coating pearl layer 10.

The outdoor color changeable film with self recovering functions of the present invention is installed on a flat surface such as glass of a vehicle or a building as described above, and it is preferred that the transparent base film 20 has low elasticity and hardness so as to be easily adhered on the flat surface.

Accordingly, the transparent base film 20 used any one of polyethylene terephthalate (PET), polyimide (PI), and polycarbonate (PC) which have low elasticity and hardness.

Various hard coating agents for forming the hard coating pearl layer 10 may be used, but it is preferred that the viscosity is 40 to 45 cps so that the mixed pearl particles may be evenly distributed.

Further, when the viscosity of the hard coating agent is low, a liquid flow phenomenon occurs when the hard coating agent is coated on the transparent base film 20 and the coating surface may become uneven, and thus, it is preferred that the viscosity of the hard coating agent is adjusted to the viscosity in the viscosity range. In addition, if the viscosity is too high, a mash pattern may be formed due to a characteristic of micro gravure in a process of coating the micro gravure.

The hard coating agent may be made of various compositions, but preferably, made of a self-recovering coating agent, pearl particles, and a curing agent, and it is preferred that the content of self-recovering coating agent: pearl particles: curing agent is a weight ratio of 90 to 100:0.5 to 2:35 to 40.

The self-recovering coating agent uses a mixture of 5 to 30 parts by weight of a trimethylene oxide-reactive polyurethane prepolymer with respect to 100 parts by weight of a coating agent-based chitosan-reactive polyester prepolymer.

The pearl particles may have various shapes. That is, the pearl particles may have either spherical particles or plate-shaped particles. However, in the case of the spherical particles, a reflective angle is small and the glare is reduced, and thus it is preferable to use the plate-shaped particles.

The pearl particles may be plate-shaped synthetic pearls or natural pearls, and 0.5 to 2 parts by weight of the hard coating agent is preferably used as described above. When the content of the pearl particles is small, a color changeable effect deteriorates, and when the content is large, the visibility, which is a basic function of the window film, may deteriorate, and thus it is preferred that the pearl particles are mixed in an amount in the above range.

The particle size of the pearl particles is preferably 1 to 100 μm. When the particle size is 1 μm or less, the color changeable effect deteriorates, and when the particle size is 100 μm or more, the pearl particles are misrecognized as a foreign substance in the coating process or the visibility of the glass deteriorates in the case of being installed on the glass.

The adhesive coating layer 30 has a function of blocking ultraviolet rays and to this end, the adhesive coating agent is made of an acrylic adhesive, a UV stabilizer, a UV absorber, a mixed solvent of metal ethyl ketone and toluene, and a mixing ratio thereof is a weight ratio of 10:0.1:2:12, and a metal chelate and isocyanate may be added as the curing agent.

The amount of the curing agent is preferably 1 to 30 parts by weight with respect to the total weight of the adhesive coating agent.

Further, in the outdoor color changeable film with self recovering functions according to the present invention, a color base film 50 laminated with a color adhesive layer 50c may be further laminated between the transparent base film 20 and the adhesive coating layer 30 so as to implement more various colors.

The color adhesive layer 50c is laminated on a surface facing the hard coating layer 10 and may be formed of an infrared blocking agent and an adhesive mixed with a pigment or a dye.

The color adhesive layer 50c is made of an adhesive formed by mixing a pigment or a dye with a substrate formed by acryl and epoxy, a urethane adhesive and an acrylic pressure-sensitive adhesive, and the amount of the pigment or the dye is preferably 0.5 to 2 parts by weight with respect to the total weight of the adhesive. When the pigment or the dye is excessively mixed, the visibility of the glass deteriorates and when the content of pigment or the dye is small, the saturation is lowered.

An example of the adhesive configuring the color adhesive layer is formed of 23% of a solid by mixing an acrylic pressure-sensitive adhesive, a metal chelate curing agent, an antimony tin oxide infrared blocking agent, a mixed solvent of methyl ethyl ketone and toluene at a weight ratio of 10:0.3:6:8.

Hereinafter, a method for manufacturing the outdoor color changeable film with self recovering functions according to the present invention configured above will be described.

The method for manufacturing the outdoor color changeable film with self recovering functions according to the present invention includes a hard coating step of coating a hard coating agent mixed with pearl particles on the upper surface of a transparent base film with a thickness of 12 to 15 μm by using a micro gravure coater; a hard-coating agent curing step of thermally curing the transparent base film coated with the hard coating agent in an atmosphere of 125 to 140° C.; and a coating step of coating an adhesive coating agent on the lower surface of the transparent base film with a thickness of 5 to 6 μm using the micro gravure coater.

In the manufacturing method, after the adhesive coating step, it is preferred to perform a process of further laminating a release protective film in order to protect the adhesive coating layer.

An ultraviolet blocking agent or a ultraviolet absorber may be further mixed with the adhesive coating agent used in the adhesive coating step.

Further, in order to express more various colors, a color adhesive layer may be further formed and the step of forming the color adhesive layer is performed before the hard coating step.

That is, the infrared blocking agent and the adhesive mixed with the pigment or dye are coated on the upper surface of the transparent base film with a thickness of 5 to 6 μm, a bonding step of bonding a polyethylene terephthalate film (PET) with a thickness of 23 to 100 μm on the coating surface of the adhesive is further performed, and then the hard coating layer is formed on the surface of the boned PET film.

The ultraviolet blocking agent or the ultraviolet absorber mixed with the adhesive coating agent may block ultraviolet rays in a wavelength band of 400 nm and effectively block the incidence of pests.

Experimental Example 1

The degree of haze according to the content of pearl particles was measured using a haze meter.

| Content of pearl particles | 0.5 | 1.0 | 1.5 | 2.0 |
|---|---|---|---|---|
| Haze | 0.2 | 0.5 | 1.0 | 1.3 |
| Visibility | Good | Good | Slight poor | Poor |

As can be seen in Table above, the content of pearl particles is preferably 0.5 to 1.0 according to the degree of haze.

Experimental Example 2

The degree of haze according to the size of pearl particles was measured using a haze meter.

| Size of pearl particles | 0.2 to 1 μm | 1 to 45 μm | 45 to 70 μm | 100 μm or more |
|---|---|---|---|---|
| Visibility | Deterioration of visibility | Good | Good | Recognized as foreign substance |
| Haze | 4.2 | 1.5 | 2.1 | 2.2 |

As can be seen from Table above, when the particle size of the pearl particles is 0.2 to 1 μm, the haze due to the diffuse reflection of the pearl particles is increased and the visibility of the film is deteriorated visually. Accordingly, it is preferred to use color changeable pearl particles having a particle size of 1 to 45 μm while visibility is sufficiently secured, and it is also possible to use pearl particles having a particle size of 45 to 70 μm while the visibility is secured.

In the case of 100 μm or more, the particles are largely shown and recognized as the foreign substance, but the haze is good, but it is inappropriate for window films.

EXPLANATION OF REFERENCE NUMERALS AND SYMBOLS

10: Hard coating pearl layer
20: Transparent base film
30: Adhesive coating layer
40: Release film
50: Color base film
50c: Color adhesive layer

What is claimed is:

1. An outdoor color-changeable film, comprising:
a transparent base film that comprises polyethylene terephthalate (PET), polyimide (PI), polycarbonate (PC), and combinations thereof;
a hard-coating pearl layer that is formed on an outer surface of the transparent base film and that comprises pearl particles dispersed in a hard-coating agent, the pearl particles having a plate shape, having a reflective angle which is larger than that of pearl particles having a spherical shape, and having a particle size ranging from 1 to 100 μm;
a first adhesive layer disposed on another surface of the transparent base layer;
a color base film disposed on the first adhesive layer to laminate the color base film onto a surface of the hard-coating pearl layer;
a second adhesive layer coated on a surface of the color base film; and
a release film detachably laminated onto the second adhesive layer,
wherein the hard coating agent in which the pearl particles are dispersed has an initial viscosity ranging from 40 to 45 cps, requires a curing agent, and the hard coating agent, the pearl particles and the curing agent are mixed in a weight ratio of 90-100:0.5-2: 35-40, respectively, before curing,
wherein the hard coating agent is a prepolymer mixture that comprises 5 to 30 parts by weight of a trimethylene oxide-reactive polyurethane prepolymer with respect to 100 parts by weight of a chitosan-reactive polyester prepolymer that is a coating agent-based chitosan-reactive polyester prepolymer.

2. The outdoor color-changeable film according to claim 1, wherein the hard-coating pearl layer provides the outdoor color-changeable film with self-recovering properties that extend the longevity of the outdoor color-changeable film and that include water repellency, anti-fouling, antibacterial, and insecticidal properties.

3. The outdoor color-changeable film according to claim 1, wherein the reflective angle of the pearl particles is selected to be effective to provide the outdoor color-changeable film with a glare effect.

4. The outdoor color-changeable film according to claim 1, wherein the pearl particles are uniformly dispersed in the hard coating agent.

5. The outdoor color-changeable film according to claim 1, wherein the transparent base film has a low elasticity and hardness that are effective for adherence to a flat surface.

6. An outdoor color-changeable film, comprising:
a transparent base film that comprises polyethylene terephthalate (PET), polyimide (PI), polycarbonate (PC), and combinations thereof;
a hard-coating pearl layer that is formed on an outer surface of the transparent base film and that comprises pearl particles dispersed in a hard-coating agent, the pearl particles having a plate shape, having a reflective angle which is larger than that of pearl particles having a spherical shape, and having a particle size ranging from 1 to 100 μm;
a first adhesive layer disposed on another surface of the transparent base layer;
a color base film disposed on the first adhesive layer to laminate the color base film onto a surface of the hard-coating pearl layer;
a second adhesive layer coated on a surface of the color base film; and
a release film detachably laminated onto the second adhesive.

7. An outdoor color-changeable film, comprising:
a transparent base film that comprises polyethylene terephthalate (PET), polyimide (PI), polycarbonate (PC), and combinations thereof;
a hard-coating pearl layer that is formed on an outer surface of the transparent base film and that comprises pearl particles dispersed in a hard-coating agent, the pearl particles having a plate shape, having a reflective angle which is larger than that of pearl particles having a spherical shape, and having a particle size ranging from 1 to 100 μm;
a first adhesive layer disposed on another surface of the transparent base layer;
a color base film disposed on the first adhesive layer to laminate the color base film onto a surface of the hard-coating pearl layer;
a second adhesive layer coated on a surface of the color base film; and
a release film detachably laminated onto the second adhesive layer,
wherein hard-coating pearl layer is formed on an outer surface of the transparent base film by a process including:
providing an uncured hard coating agent in which the pearl particles are dispersed that is a prepolymer mixture comprising 5 to 30 parts by weight of a trimethylene oxide-reactive polyurethane prepolymer with respect to 100 parts by weight of a chitosan-reactive polyester prepolymer which is a coating agent-based chitosan-reactive polyester prepolymer having, the uncured hard coating agent having an initial viscosity ranging from 40 to 45 cps;
mixing the uncured hard coating agent, the pearl particles, and a curing agent in a weight ratio of 90-100:0.5-2: 35-40, respectively, to provide an uncured mixture;
coating the uncured mixture on the outer surface of the transparent base film; and curing the uncured mixture to provide the hard-coating pearl layer.

* * * * *